United States Patent
Reine

(10) Patent No.: US 6,845,150 B1
(45) Date of Patent: *Jan. 18, 2005

(54) CHECK FOR PENDING E-MAIL USING CALLER ID AND SELECTIVE ANSWER RING

(75) Inventor: Gerald A. Reine, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/664,348

(22) Filed: Sep. 17, 2003

Related U.S. Application Data

(63) Continuation of application No. 09/494,570, filed on Jan. 31, 2000, now Pat. No. 6,643,360.

(51) Int. Cl.$^7$ .............................................. H04M 11/00
(52) U.S. Cl. ............................. 379/93.24; 379/100.08; 358/402
(58) Field of Search .......................... 379/88.12, 88.17, 379/88.18, 88.19, 88.2, 88.21, 88.23, 93.24, 100.08, 127.01, 127.06, 142.04, 142.05, 142.06, 196–198; 358/402

(56) References Cited

U.S. PATENT DOCUMENTS

| | | | |
|---|---|---|---|
| 5,557,659 A | 9/1996 | Hyde-Thomson | |
| 5,946,386 A | 8/1999 | Rogers et al. | |
| 6,075,846 A | 6/2000 | Jenneve et al. | |
| 6,233,315 B1 | 5/2001 | Reformato et al. | |
| 6,351,524 B1 | 2/2002 | Schuster et al. | |
| 6,643,360 B1 * | 11/2003 | Reine | 379/93.24 |

* cited by examiner

*Primary Examiner*—George Eng
(74) *Attorney, Agent, or Firm*—Hamilton, Brook, Smith & Reynolds, P.C.

(57) ABSTRACT

An Internet Access server includes a caller-ID map. The caller-ID map stores a list of caller-IDs associated with the ISP with corresponding user identification and password. Upon receiving a request for a connection, the ISP extracts the caller-ID included in the request to connect, finds the corresponding user identification and password stored in the caller-ID map and retrieves the number of new messages in the caller's mailbox. If there are no new messages, an audible ringing tone is returned to the caller allowing the caller to terminate the request for connection.

13 Claims, 5 Drawing Sheets

CHECK FOR PENDING E-MAIL USING CALLER ID AND SELECTIVE ANSWER RING

RELATED APPLICATION(S)

This application is a continuation of U.S. application Ser. No. 09/494,570, filed Jan. 31, 2000 now U.S. Pat. No. 6,643,360. The entire teachings of the above application is incorporated herein by reference.

BACKGROUND OF THE INVENTION

Internet Service Providers ("ISP") provide access to the Internet to dial-up clients over the Public Switched Telephone Network ("PSTN"). Typically, the ISP also provides access to a mail server. The mail sever stores mail messages for the client in a client mailbox. The mail server may be in the same server as the ISP or in a remote server which communicates with the ISP over a data network.

To access the client mailbox, the dial-up client dials the ISP's telephone number. After the phone call is connected, the dial-up client logs into the mail server and can access mail messages stored in the client mailbox. The dial-up client can only determine if a new mail message has been stored in the client mailbox after the call is connected and the client has logged into the mail server. This involves connecting the dial-up client and the ISP for a time period typically greater than one minute.

While the dial-up client is connected to the ISP, phone charges may be incurred for the telephone call. Also, because the connection between the ISP and the dial-up client, is a dedicated connection, this connection cannot be used by another dial-up client. Thus, congestion may occur at peak periods, as large numbers of clients attempt to connect to the ISP, in order to determine if a new mail message has been delivered to their mailboxes.

SUMMARY OF THE INVENTION

The status of a mailbox is provided by a called user to a calling user before making a connection between the calling user and the called user. The calling user transmits a calling user identification in a request for connection to the called user. A caller-identification routine in the called user extracts the calling user identification from the request. A calling user password corresponding to the calling user identification is stored in a calling user identification table. A mail server access routine requests the mailbox status using the stored calling user password. A mailbox status routine provides the mailbox status to the calling user.

If the mailbox status indicates that there is a new message in a mailbox, the mailbox status routine connects the calling user and the called user. If the mailbox status indicates that there is no new message in a mailbox, the mailbox status routine alerts the calling user.

The request for connection can be an ISDN protocol message.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates an Internet Service Provider including a caller ID map for providing status of a client mailbox in a mail server to a dial-up client according to the principles of the present invention;

FIG. 2 illustrates the caller-ID map shown in FIG. 1;

FIG. 3 illustrates the client mailbox shown in FIG. 1;

FIG. 4 is a flowchart of the steps performed in the Internet Service Provider for providing status of a client mailbox to a dial-up client;

FIG. 5 is a flowchart of the steps performed in the Internet Service Provider to determine the status of a client mailbox.

DETAILED DESCRIPTION OF THE INVENTION

A description of preferred embodiments of the invention follows.

FIG. 1 illustrates an Internet Service Provider 102 including a caller ID interface 108 for providing mailbox status of a client mailbox 106 in a mail server 104 to a dial-up client 100*a–c*. Three dial-up clients 100*a–c* are shown connected to the Public Switched Telephone Network ("PSTN"). A dial-up client 100*a–c* includes a modem (not shown) for connecting to the PSTN. A dial-up client 100*a–c* may be a personal computer, a FAX machine or any other device which can connect to an ISP 102. Any of the dial-up clients 100*a–c* may issue a request for connection to the ISP 102 over a dial-up client connection 112*a–c* to the PSTN. The PSTN forwards the request for connection to the ISP 102 over the ISP connection 110 to the PSTN.

The request for connection includes the called telephone number dialed (the ISP's telephone number) and the calling telephone number (the dial-up client's telephone number). Upon receiving a request for connection from a dial-up client 100*a–c*, the ISP 102 searches the caller-ID interface 108 with the calling telephone number for a corresponding caller-ID entry. If a caller-ID entry is found, the ISP 102 uses the dial-up client's user identification and password for the mail server 104, stored in the caller-ID entry, to access the mail server 104 and check the status of the client mailbox 106. The dial-up client connection 112*a–c* is typically to a Central Telephone Office (not shown) connected to the PSTN. The ISP connection 110 is to an integrated Data Services Network ("ISDN") server (not shown) connected to the PSTN.

The ISP 102 connects the dial-up client 100*a–c* and the ISP 102 immediately if an unread message is stored in the client mailbox 106. The unread message may be a new mail message delivered to the client mailbox or an old mail message the dial-up client did not read on a previous connection. The connection is made without sending an audible ringing tone to the dial-up client 100*a–c*. The mail message stored in the client mailbox may include text documents, audio files, video files or FAX documents or any other document which can be transmitted over a data network. The ISP 102 alerts the dial-up client 100*a–c* if there are no unread messages stored in the client mailbox 102. The audible ringing tone received by the dial-up client 100*a–c* from the PSTN indicates that no new messages have been delivered to the client mailbox 106. Alternatively, the alert message from the ISP may be converted into a message displayed on a monitor connected to the dial-up client 100*a–c* by a software routine executing in the dial-up client 100*a–c*.

While the ISP 102 is alerting the dial-up client 100*a–c*, the dial-up client 100*a–c* may terminate the connection request without incurring a telephone charge. If the dial-up client 100*a–c* does not terminate the connection request, the dial-up client 100*a–c* is connected to the ISP 102 after the ISP 102 completes the alert.

Thus, the dial-up client 100*a–c* receives mailbox status before the telephone call has been connected and may determine whether to continue with the request for connection if there are no new messages in the client mailbox 106.

Figure 1:
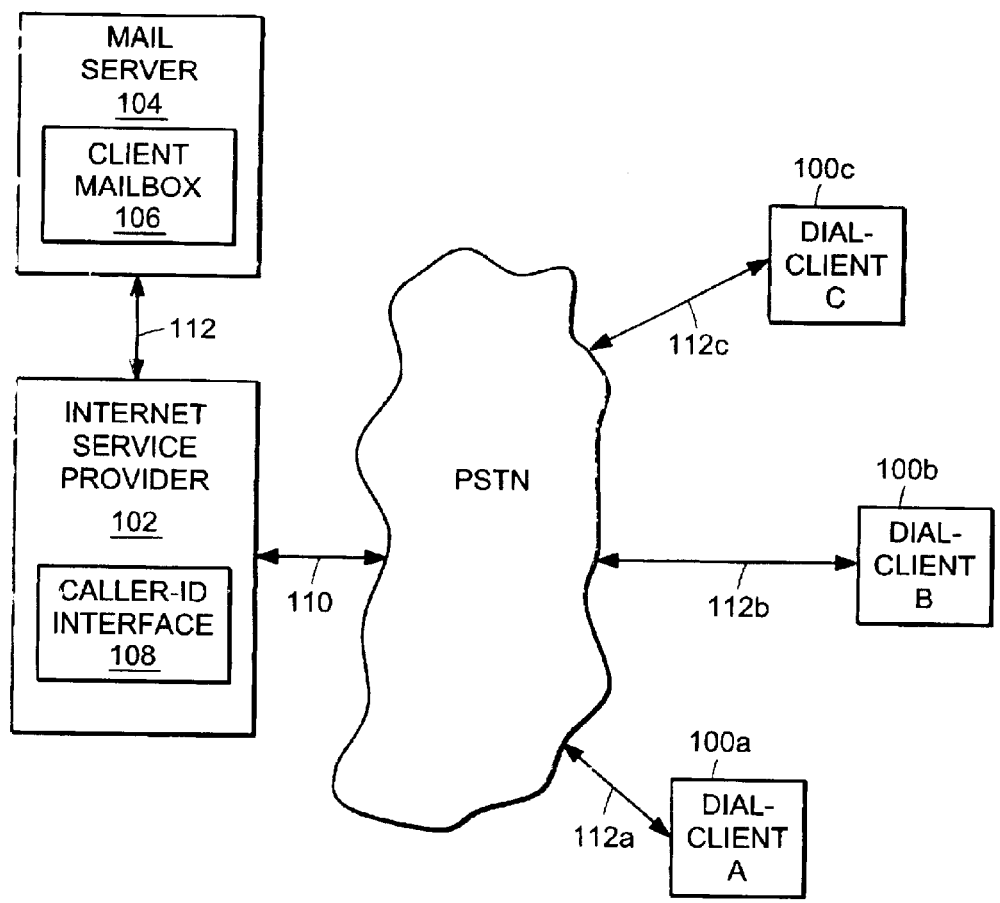
Figure 2:
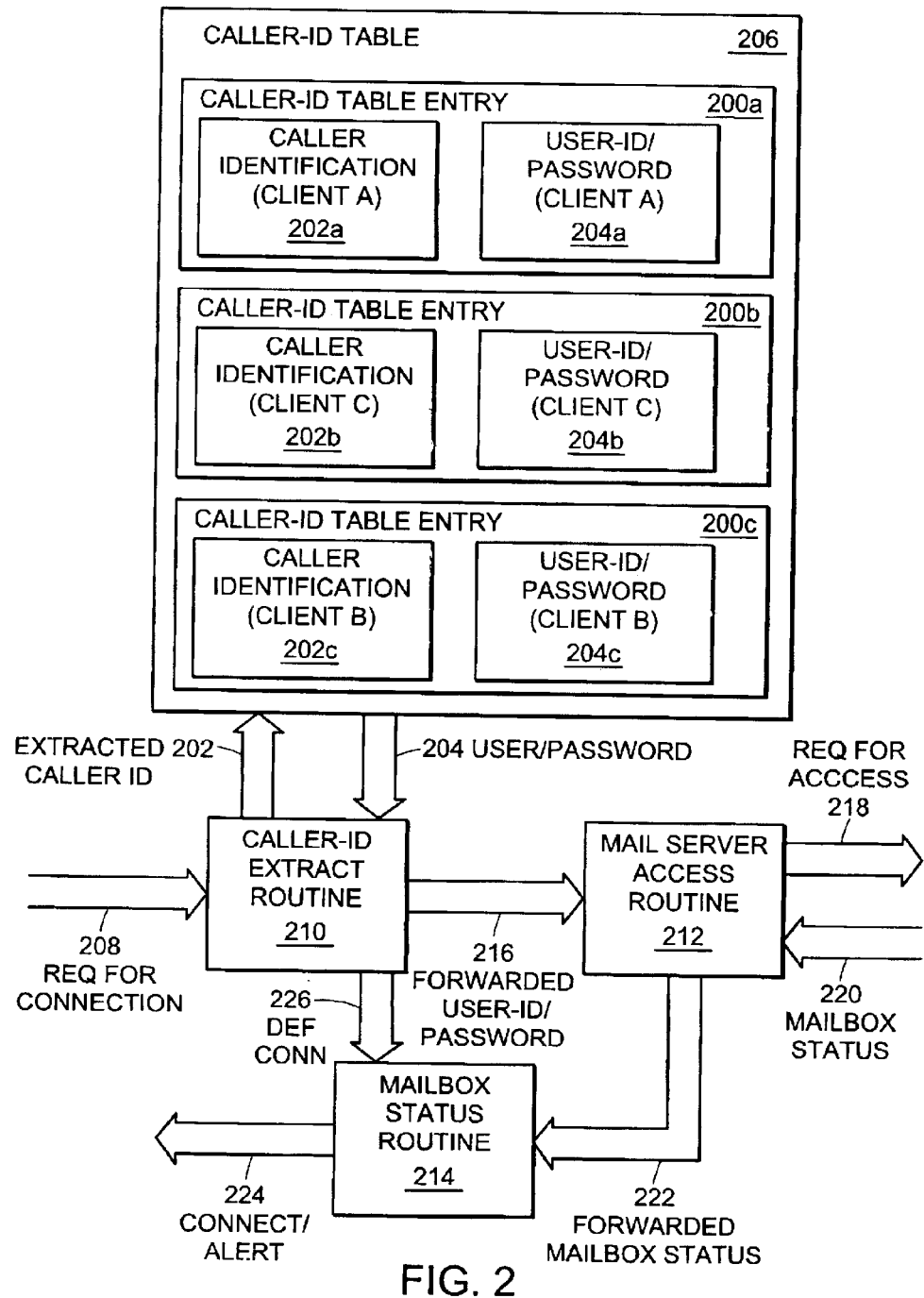

FIG. 2 illustrates the caller-ID interface 108 shown in FIG. 1. The caller-ID interface 108 includes a caller-ID table 206, a caller-ID extract routine 210, a mail server access routine 212 and a mailbox status routine 214. The caller-ID table 206 includes caller-ID map entries 200*a–c*. Each caller-ID map entry 200*a–c* includes a caller-ID 202*a–c* and a user identification and password 204*a–c* for the mail server 104 (FIG. 1). The caller-ID 202*a–c* is the calling telephone number. The user identification and password 204*a–c* stores user parameters assigned to the dial-up client 100*a–c* for accessing the client mailbox 106 (FIG. 1). Thus a mail server user identification and password 204*a–c* is associated with a calling telephone number in the caller-ID table 206. The caller-ID extract routine 210 extracts the calling telephone number from the request for connection transmitted from the dial-up client 100*a–c* (FIG. 1) and searches the caller-ID table 206 for a caller-ID table entry 202*a–c* containing the calling telephone number. If a caller-ID table entry 200*a–c* is found, the user identification and user password 204*a–c* stored in the caller-ID table entry 200*a–c* are forwarded to the caller-1D extract routine 210.

The mail server access routine 212 receives the forwarded user identification and password 216 from the caller-ID extract routine 210. The mail server access routine 212 requests access 218 to the mail server 104 (FIG. 1) using the dial-up client's user identification and password 204*a–c*. The mailbox status 220 is returned to the mail server access routine from the client mailbox 106 (FIG. 1) in the mail server 104 (FIG. 1).

The mailbox status routine 214 receives the forwarded mailbox status 222 from the mail server access routine 212 and sends a connect or alert message 224 to the dial-up client 100*a–c* (FIG. 1).

Figure 3:
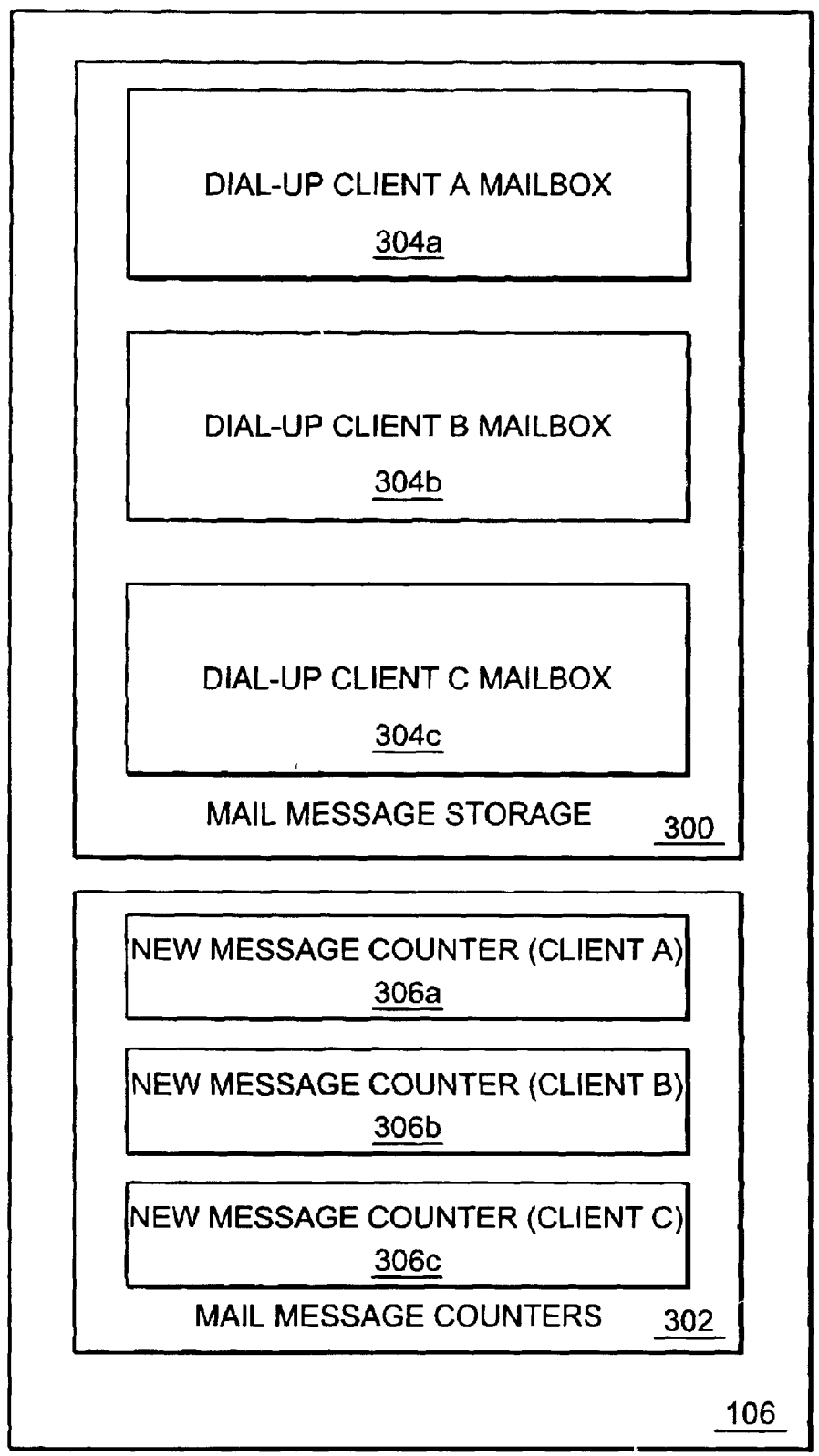

FIG. 3 illustrates the client mailbox 106 shown in FIG. 1. The client mailbox includes mail message storage 300 for storing received messages for the dial-up client 100*a–c*, and mail message counters 302. The mail message storage 300 includes a dial-up client mailbox 304*a–c* for each dial-up client 100*a–c* (FIG. 1). The mail message counters 302 include a dial-up client new message counter 306*a–c* for each dial-up client 100*a–c* (FIG. 1). Upon receiving a mail message for a dial-up server 100*a–c*, the mail server 104 (FIG. 1) stores the mail message in the dial-up client mailbox 304*a–c* in mail storage 300 and increments the dial-up clients new mail message counter 306*a–c*. The mail server 104 (FIG. 1) decrements the new mail message counter 306*a–c* after a mail message is read by the dial-up client 100*a–c* (FIG. 1). Thus, the new mail message counters 302 store a count of the number of unread messages stored in the client mailbox 106.

Figure 4:
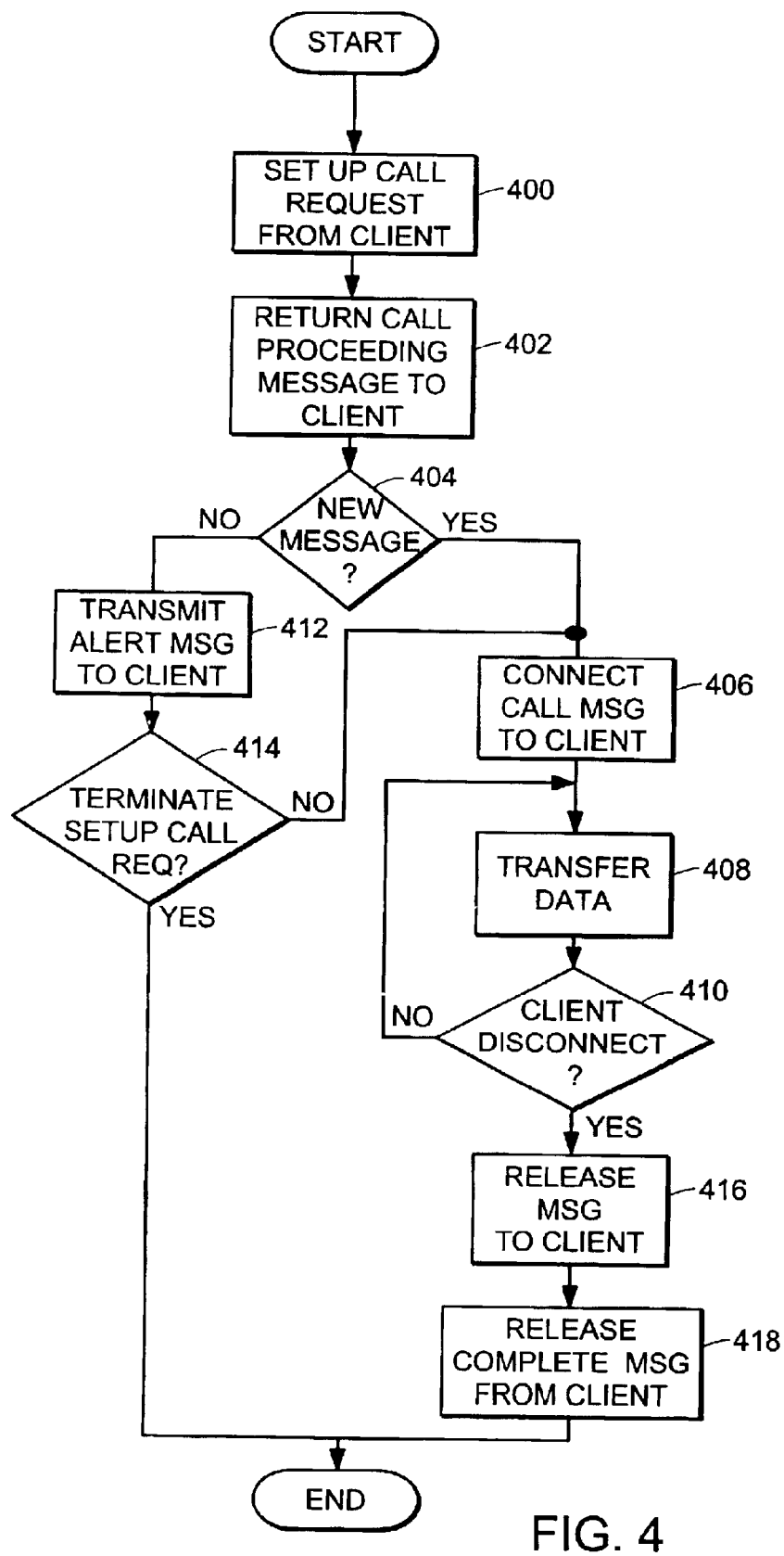

FIG. 4 is a flowchart of the steps performed in the ISP 102 (FIG. 1) for providing mailbox status for the dial-up client mailbox 304*a–c* (FIG. 3) to a dial-up client 100*a–c* (FIG. 1). The method shown in FIG. 1 assumes that the ISP connection 110 (FIG. 1) to the PSTN implements the Integrated Services Digital Network ("ISDN") protocol on a T1 line to an ISDN server (not shown). An E1 line to the ISDN server (not shown) is used in countries other than the United States. The Channelized Associated Signaling ("CAS") protocol may also be used to communicate over the T1 or E1 line.

The network layer of ISDN, Q.931 provides procedures to make an end to end connection, such as the ISP connection 110 (FIG. 1).

At step 400, the dial-up client 100*a–c* (FIG. 1) requests a connection to the ISP 102 (FIG. 1) by dialing the ISP's telephone number. The ISP's telephone number is transmitted from the dial-up client 100*a–c* to the Central (local) Telephone Office (not shown). The Central Telephone Office forwards the ISP's telephone number and dial-up client's number over the PSTN to the ISDN server (not shown). The ISDN server forwards a request for connection in a set up call request message on the ISP connection 110 (FIG. 1) to the ISP 102 (FIG. 1). The set up call request message includes the ISP's telephone number and the dial-up client's telephone number.

At step 402, the ISP 102 (FIG. 1) returns a call proceeding message through the ISP connection 110 (FIG. 1) to the PSTN. The message is forwarded from the ISDN server through the PSTN to the dial-up client 102*a–c* through the Central Telephone Office.

At step 404, the ISP 102 (FIG. 1) determines if a new mail message has been delivered to the client mailbox 106 (FIG. 1) in the mail server 104 (FIG. 1). A new mail message is any unread message in the dial-up client's mailbox 304*a–c* (FIG. 3). A method for checking the status of mail messages stored in the client mailbox 106 (FIG. 1) is described in conjunction with FIG. 5.

If there is no new message for the dial-up client 102*a–c* in the client mailbox 106 (FIG. 1), processing continues with step 412. If there is a new message, processing continues with step 406.

At step 412, the ISP 102 sends an alert message through the ISP connection 110 (FIG. 1) to the PSTN. The alert message is forwarded through the PSTN to the dial-up client 102*a–c* through the Central Telephone Office. The alert message alerts the dial-up client 102*a–c* (FIG. 1) by, for example, producing an audible ringing tone.

At step 414, the audible ringing tone at the dial-up client 100*a–c* (FIG. 1) indicates that there are no new messages in the client mailbox 106 (FIG. 1). If the dial-up client 100*a–c* (FIG. 1) terminates the call set up, processing is complete. If not, processing continues with step 406.

At step 406, the ISP 102 (FIG. 1) transmits a connect message to the PSTN. The PSTN delivers the connect message to the dial-up client 100*a–c* (FIG. 2) through the Central Telephone Office.

At step 408, the dial-up client 100*a–c* (FIG. 1) and ISP 102 (FIG. 1) communicate over the PSTN on the dedicated connection. The dial-up client 102*a–c* (FIG. 1) may perform mailbox functions, such as read mail messages stored in the dial-up client mailbox 304*a–c* (FIG. 3) in the mail server 104 (FIG. 1), delete messages stored in the dial-up client mailbox 304*a–c* (FIG. 3), or send a mail message to another client mailbox in another mail server, or may perform any Internet function, for example, Telnet to a server or access a HTTP page on a World Wide Web server.

At step 410, the ISP 102 (FIG. 1) checks for a disconnect message from the dial-up client 100*a–c* (FIG. 1). If there is no disconnect message, processing continues with step 408 and the ISP continues to service Internet data transfer requests from the dial-up client 100*a–c* (FIG. 1). If there is a request to disconnect, processing continues with step 416.

At step 416, the ISP 102 (FIG. 1) transmits a release message to the dial-up client 100*a–c* (FIG. 1).

At step 418, the dial-up client 100a–c (FIG. 1) transmits a release complete message to the ISP 102 (FIG. 1). The ISP 102 (FIG. 1) and the dial-up client 100a–c (FIG. 1) are no longer connected.

Figure 5:
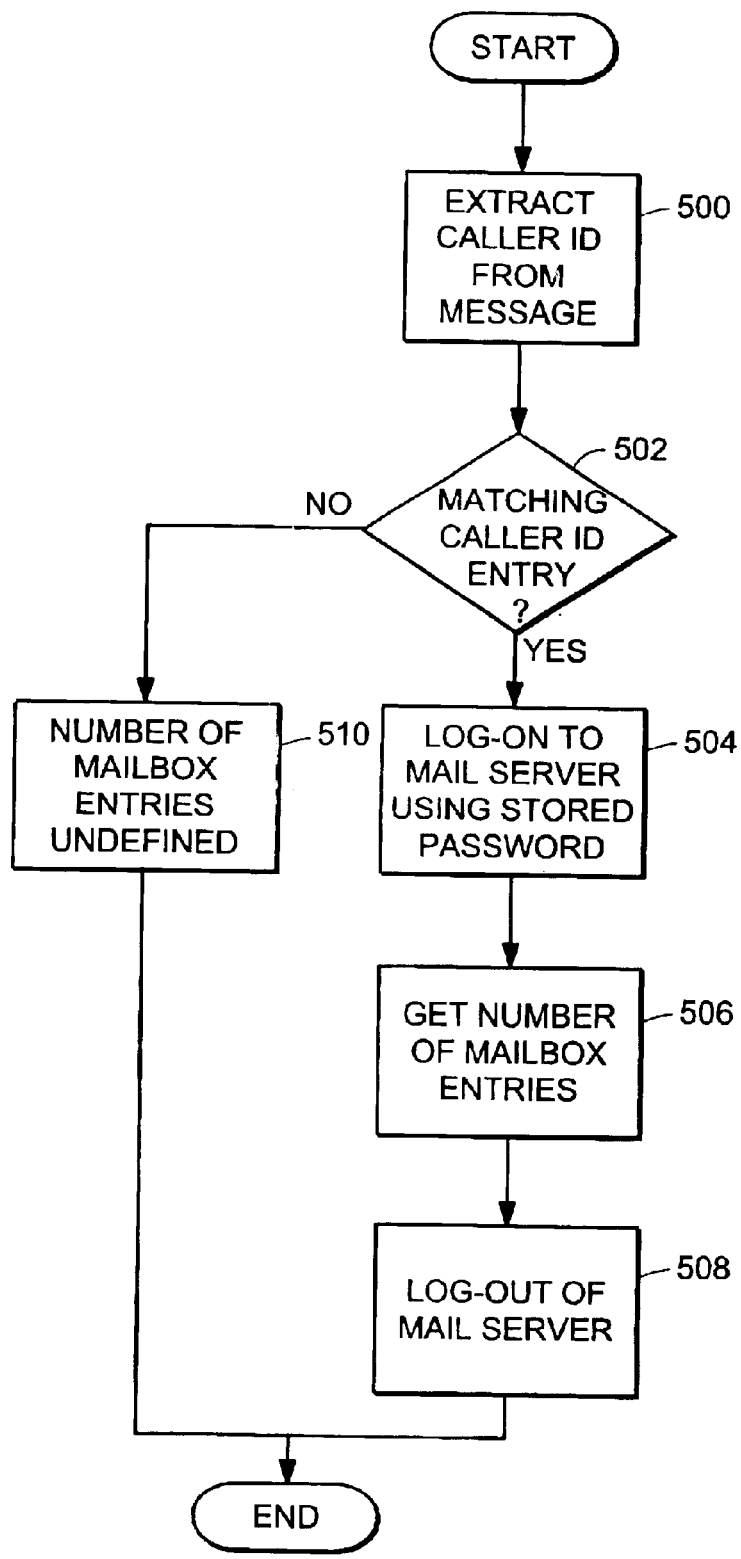

FIG. 5 is a flow chart of the steps performed in the ISP 102 (FIG. 1) to determine the status of a client mailbox 106 (FIG. 1).

At step 500, the caller-ID extract routine 210 (FIG. 2) in the ISP 102 (FIG. 1) extracts the calling telephone number (caller-ID) from the request for connection 208 in the set up call message received from the dial-up client 100a–c (FIG. 1).

At step 502, the caller-ID extract routine 210 (FIG. 2) ISP 102 (FIG. 1) searches the caller-ID table 206 (FIG. 2) for a caller-ID table entry 202a–c (FIG. 2) matching the extracted caller-ID 202. If there is a match, processing continues with step 504. If not, processing continues with step 510.

At step 504, the mail server access routine 212 (FIG. 2) in the ISP 102 (FIG. 1) uses the user identification and password 204a–c (FIG. 2) corresponding to the caller-ID 202a–c (FIG. 2) stored in the matching caller-ID table entry 200a–c (FIG. 2) in the caller-ID table 206 (FIG. 2) to access the mail server 104 (FIG. 1).

At step 506, the number of new mail messages stored in the new mail message counter 302 (FIG. 3) in the client mailbox 106 (FIG. 3) is transmitted to the mail server access routine 212 (FIG. 2) in the ISP 102 (FIG. 1).

At step 508, the mail server 104 (FIG. 1) logs out of the mail server 104 (FIG. 1).

At step 510, there is no matching caller-ID table entry 200a–c (FIG. 2) in the caller-ID table 108 (FIG. 2). Thus, the number of new mail messages is undefined. The caller-ID extract routine 210 forwards a default count 226 to the mail box status routine 214 (FIG. 2) set to a predefined number greater than zero indicating that the dial-up client 100a–c (FIG. 1) may have a new mail message. The ISP 102 (FIG. 1) completes the connection to the dial-up client 100a–c to enable the dial-up client 100a–c (FIG. 1) to access the client mailbox 106 (FIG. 1) in the mail server 104 (FIG. 1).

It will be apparent to those of ordinary skill in the art that methods involved in the present invention may be embodied in a computer program product that includes a computer usable medium. For example, such a computer usable medium can consist of a read only memory device, such as a hard drive device or a computer diskette, having computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for providing the status of a mailbox by an mail service provider to a calling user before making a connection between the calling user and the mail service provider comprising:
    a caller-identification routine which extracts a calling user identification from a request for connection transmitted from the calling user to the mail service provider;
    a mail server access routine which requests the status of a mailbox corresponding to the calling user identification; and
    a mailbox status routine which alerts the calling user if the status indicates that there is no unread message in the mailbox to allow the calling user to terminate the request for connection before the connection is made, the calling user is connected to the mail service provider after completion of the alert unless the calling user terminates the request for connection.

2. The apparatus of claim 1 wherein the mailbox status routine connects the calling user and the mail service provider without sending an audible ringing tone to the calling user if the status of the mailbox indicates there is an unread message in the mailbox.

3. The apparatus of claim 1 wherein the request for connection is an ISDN message.

4. The apparatus of claim 1 wherein the mailbox status routine alerts the calling user by sending an audible ringing tone.

5. A method for providing the status of a mailbox by an mail service provider to a calling user before making a connection between the calling user and the mail service provider comprising the steps of:
    extracting, in a caller-identification routine, a calling user identification from a request for connection transmitted from the calling user to the mail service provider;
    requesting status of a mailbox, in a mail server access routine, using the calling user identification; and
    alerting the calling user if the status indicates that there is no unread message in the mailbox to allow the calling user to terminate the request for connection before the connection is made, the calling user is connected to the mail service provider after completion of the alert unless the calling user terminates the request for connection.

6. The method of claim 5 wherein the calling user is connected to the mail service provider without sending an audible ringing tone to the calling user if the mailbox status indicates that there is an unread message in the mailbox.

7. The method of claim 5 wherein the request for connection is an ISDN message.

8. The apparatus of claim 5 wherein the step of alerting sends an audible ringing tone to the calling user.

9. An apparatus for providing the status of a mailbox by an mail service provider to a calling user before making a connection between the calling user and the mail service provider comprising:
    means for extracting a calling user identification from a request for connection transmitted from the calling user to the mail service provider;
    means for requesting status of a mailbox using the calling user identification; and
    means for alerting the calling user if the status indicates that there is no unread message in the mailbox to allow the calling user to terminate the request for connection to the mail service provider before the connection is made, the calling user is connected after completion of the alert unless the calling user terminates the request for connection.

10. The apparatus of claim 9 wherein the calling user and the mail service provider are connected without sending an audible ringing tone to the calling user if the status indicates there is an unread message in the mailbox.

11. The apparatus of claim 9 wherein the request for connection is an ISDN message.

12. The apparatus of claim 9 wherein the means for alerting alerts the calling user by sending an audible ringing tone.

13. A computer program product for providing the status of a mailbox by a mail service provider to a calling user before making a connection between the calling user and the mail service provider, the computer program product comprising a computer usable medium having computer readable code thereon, including program code which:

extracts a calling user identification from a request for connection transmitted from the calling user to the mail service provider;

requests status of a mailbox using the calling user identification; and alerts the calling user if the status indicates that there is no unread message in the mailbox to allow the calling user to terminate the request for connection to the mail service provider before the connection is made, the calling user is connected after completion of the alert unless the calling user terminates the request for connection.

\* \* \* \* \*